US010082093B2

(12) United States Patent
Takayanagi et al.

(10) Patent No.: US 10,082,093 B2
(45) Date of Patent: Sep. 25, 2018

(54) KNOCKING DETERMINATION DEVICE AND KNOCKING CONTROL DEVICE FOR INTERNAL COMBUSTION ENGINE

(71) Applicant: Mitsubishi Heavy Industries, Ltd., Tokyo (JP)

(72) Inventors: Ko Takayanagi, Tokyo (JP); Masataka Shiraishi, Tokyo (JP); Ryo Sase, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/110,722

(22) PCT Filed: Nov. 25, 2014

(86) PCT No.: PCT/JP2014/081002
§ 371 (c)(1),
(2) Date: Jul. 8, 2016

(87) PCT Pub. No.: WO2015/104909
PCT Pub. Date: Jul. 16, 2015

(65) Prior Publication Data
US 2016/0333806 A1    Nov. 17, 2016

(30) Foreign Application Priority Data
Jan. 10, 2014  (JP) .................... 2014-002968

(51) Int. Cl.
*F02D 41/00*    (2006.01)
*F02D 35/02*    (2006.01)
(Continued)

(52) U.S. Cl.
CPC ......... *F02D 35/027* (2013.01); *F02D 35/023* (2013.01); *F02D 41/042* (2013.01);
(Continued)

(58) Field of Classification Search
CPC ...... F02D 35/027; F02D 35/023; F02D 41/26; F02D 41/042; F02D 41/12; F02D 41/22;
(Continued)

(56) References Cited

U.S. PATENT DOCUMENTS 4,991,553 A * 2/1991 Kurihara ............... F02P 5/1523
123/406.37
5,598,822 A * 2/1997 Fujishita ............... G01L 23/225
123/406.38
(Continued)

FOREIGN PATENT DOCUMENTS

EP    0709662 A1    5/1996
JP    H0914043 A    1/1997
(Continued)

OTHER PUBLICATIONS

Extended European Search Report, European Patent Application No. 147877895.4, dated Jan. 3, 2017, 6 pgs.
(Continued)

*Primary Examiner* — Hieu T Vo
*Assistant Examiner* — Sherman Manley
(74) *Attorney, Agent, or Firm* — Berkeley Law & Technology Group, LLP

(57) ABSTRACT

Provided are a knocking determination device and a knocking control device for an internal combustion engine, with which a large amount of knocking can be detected quickly and with which knocking is easily determined. A knocking time window and a bandpass filter (BPF) are used (B1-B2) to extract a knocking frequency waveform signal from a knock sensor signal (Sg1), and integration is performed to obtain a first calculated value (B3). A reference time window and a BPF are used (B4-B5) to extract a reference frequency waveform signal from the knock sensor signal (Sg1), and integration is performed to obtain a second calculated value
(Continued)

(B6). The average value of multiple instances of the second calculated value is obtained (B7), and the first calculated value is divided by the average value to obtain a signal-to-noise (S/N) ratio (B8). A multiplied value is obtained (B9) by multiplying the S/N ratio by a weighting coefficient, a moving average value for several of the multiplied values is obtained (10), and the moving average is used as a knocking indicator to determine knocking and to perform a control (B11-13).

8 Claims, 5 Drawing Sheets

(51) Int. Cl.
| | |
|---|---|
| *F02P 5/152* | (2006.01) |
| *F02D 41/22* | (2006.01) |
| *G01L 23/22* | (2006.01) |
| *F02D 41/04* | (2006.01) |
| *F02D 41/12* | (2006.01) |
| *F02D 41/26* | (2006.01) |
| *F02D 41/14* | (2006.01) |

(52) U.S. Cl.
CPC .............. *F02D 41/12* (2013.01); *F02D 41/22* (2013.01); *F02D 41/26* (2013.01); *F02P 5/152* (2013.01); *G01L 23/221* (2013.01); *F02D 2041/1432* (2013.01); *Y02T 10/46* (2013.01)

(58) Field of Classification Search
CPC ............ F02D 2041/1432; G01L 23/221; F02P 5/152; Y02T 10/46
See application file for complete search history.

(56) References Cited

U.S. PATENT DOCUMENTS

| | | | | |
|---|---|---|---|---|
| 8,326,518 B2* | 12/2012 | Komatsu | ............... | F02D 35/027 701/111 |
| 8,474,308 B2* | 7/2013 | Sgatti | .................... | F02D 35/027 73/114.07 |
| 2001/0017051 A1* | 8/2001 | Asano | ..................... | F02P 17/12 73/35.08 |
| 2006/0185422 A1* | 8/2006 | Iwade | .................. | G01L 23/225 73/35.09 |
| 2006/0236754 A1* | 10/2006 | Oe | ......................... | G01L 23/221 73/35.09 |
| 2006/0243030 A1* | 11/2006 | Oe | ......................... | G01L 23/225 73/35.09 |
| 2009/0005956 A1* | 1/2009 | Yoshihara | ............. | F02D 35/027 701/111 |
| 2013/0006505 A1* | 1/2013 | Shinagawa | ......... | F02D 41/0065 701/108 |
| 2016/0123249 A1* | 5/2016 | Sakayanagi | ........... | F02D 35/023 701/111 |

FOREIGN PATENT DOCUMENTS

| | | |
|---|---|---|
| JP | 2001234804 A | 8/2001 |
| JP | 4919097 B2 | 4/2012 |
| JP | 2012103157 A | 5/2012 |
| JP | 2007231903 A | 9/2013 |
| JP | 2013204496 A | 10/2013 |

OTHER PUBLICATIONS

International Search Report, International Application No. PCT/JP2014/081002, dated Mar. 10, 2015, 5 pgs.

Written Opinion of the International Searching Authority, International Application No. PCT/JP2014/081002, dated Mar. 10, 2015, 7 pgs.

International Preliminary Report on Patentability, International Application No. PCT/JP2014/081002, dated Jul. 21, 2016, 4 pgs.

* cited by examiner

KNOCKING DETERMINATION DEVICE AND KNOCKING CONTROL DEVICE FOR INTERNAL COMBUSTION ENGINE

TECHNICAL FIELD

The present invention relates to a knocking determination device and knocking control device for an internal combustion engine configured to perform knocking determination and control for a gas engine, a petrol engine, or the like.

BACKGROUND ART

In internal combustion engines such as gas engines and petrol engines, knocking occurs, in which fuel combusts abnormally inside cylinders. If the intensity of the knocking is high, the engines may possibly be damaged. Thus, these engines detect knocking and control the ignition timing or perform control to lower the output in accordance with the knocking intensity.

Knocking determination is done by using an in-cylinder pressure sensor or by using, for example, an acceleration sensor or the like. Generally, the following method is used for the knocking determination.
(1) Data is extracted from a sensor signal in a time period (time window) in which knocking occurs.
(2) The sensor signal is passed through a band-pass filter (hereinafter, a BPF) configured to pass only knocking-frequency components, to extract a knocking-frequency waveform signal.
(3) A computation process is performed on the extracted waveform signal to obtain the knocking intensity. The knocking intensity is obtained by performing, for example, a computation process of obtaining the greatest value of amplitude, a computation process of performing a fast Fourier transform analysis (hereinafter, an FFT analysis) and obtaining a partial over all (hereinafter, a POA), which is the sum of squares of power spectral densities around the knocking frequencies, or a computation process of integrating the waveform signal to obtain a value equivalent to a POA.
(4) Such computation is performed at each cycle. At each cycle, a knock index on the knocking intensity thus computed is obtained with the occurrence frequency over a predetermined number of cycles (e.g. 50 cycles) also taken into consideration, and knocking determination is performed with the knock index.

PRIOR ART DOCUMENTS

Patent Documents

Patent Document 1: Japanese Patent Application Publication No. 2007-231903
Patent Document 2: Japanese Patent No. 4919097

SUMMARY OF THE INVENTION

Knocking does not hold the same intensity over consecutive cycles. In conditions where knocking is prone to occur, the average of the knock index tends to increase and the knock index tends to be frequently large. Also, in a case where the knocking intensity is high, an ability to quickly detect the knocking is required to prevent the knocking from damaging the engine.

Then, in order to perform control to prevent the engine damage and maintain a certain knocking level, knocking determination needs to be done with the following points taken into consideration:
(a) performing knocking determination by using two types of information, namely, the knocking intensity and the knocking occurrence frequency; and
(b) detecting knocking quickly (e.g. in one cycle) to prevent damage to the engine in a case where the knocking intensity is high.

However, conventional knocking detection has a problem in that it requires counting the knocking occurrence frequency in addition to obtaining the knocking intensity, and therefore requires a certain number of cycles, which makes it impossible to quickly detect large knocking (see Paragraph 0041 of Patent Document 1, for example). Also, the conventional knocking detection has a problem in that it involves complicated computation to obtain a knock index (see FIGS. 8 and 9 of Patent Document 2, for example; in particular, the computation of a value u for obtaining a knock determination value Vkd1), which makes it impossible to quickly and easily detect large knocking.

The present invention has been made in view of the above problems, and an object thereof is to provide a knocking determination device and a knocking control device for an internal combustion engine capable of quickly detecting large knocking and easily performing knocking determination.

A knocking determination device for an internal combustion engine according to a first aspect of the invention for solving the above problems is a knocking determination device for an internal combustion engine comprising:
an acceleration sensor or an in-cylinder pressure sensor mounted to each of cylinder units of an internal combustion engine and configured to measure acceleration or in-cylinder pressure correlated to knocking intensity; and
control means for performing knocking determination and control based on a sensor signal measured by the acceleration sensor or the in-cylinder pressure sensor, wherein
the control means
extracts a knocking-frequency waveform signal from the sensor signal and computes a first computation value from the knocking-frequency waveform signal,
extracts a reference-frequency waveform signal from the sensor signal, computes a second computation value from the reference-frequency waveform signal, and obtains an average of a plurality of the second computation values,
obtains a ratio by dividing the first computation value by the average,
converts the ratio into a knock index including knocking intensity and a knocking occurrence frequency, and
performs the knocking determination based on a magnitude of the knock index.

A knocking determination device for an internal combustion engine according to a second aspect of the invention for solving the above problems is the knocking determination device for an internal combustion engine according to the first aspect of the invention in which the control means
defines in advance a weighting coefficient with which to convert the ratio into the knock index, and
obtains a product by multiplying the ratio by the weighting coefficient, obtains a moving average of a plurality of the products, and uses the moving average as the knock index for performing the knocking determination.

A knocking determination device for an internal combustion engine according to a third aspect of the invention for solving the above problems is the knocking determination device for an internal combustion engine according to the second aspect of the invention in which the control means increases the weighting coefficient as the ratio increases.

A knocking determination device for an internal combustion engine according to a fourth aspect of the invention for solving the above problems is the knocking determination device for an internal combustion engine according to the first aspect of the invention in which the control means defines in advance a threshold for the ratio and a predefined number of times depending on the threshold, obtains a percentage by dividing the number of times the ratio exceeds the threshold by the predefined number of times, and uses the percentage as the knock index for performing the knocking determination.

A knocking determination device for an internal combustion engine according to a fifth aspect of the invention for solving the above problems is the knocking determination device for an internal combustion engine according to the fourth aspect of the invention in which the control means defines a plurality of sets of the threshold and the predefined number of times depending on the threshold, the threshold and the predefined number of times differing between the plurality of sets such that the predefined number of times decreases as the threshold increases.

A knocking determination device for an internal combustion engine according to a sixth aspect of the invention for solving the above problems is the knocking determination device for an internal combustion engine according to any one of the first to fifth aspects of the invention in which the control means extracts the knocking-frequency waveform signal and the reference-frequency waveform signal from a same time period in the sensor signal, and sets a signal not greater than a predefined value as the reference-frequency waveform signal.

A knocking determination device for an internal combustion engine according to a seventh aspect of the invention for solving the above problems is the knocking determination device for an internal combustion engine according to any one of the first to fifth aspects of the invention in which the control means extracts the knocking-frequency waveform signal and the reference-frequency waveform signal from mutually different time periods in the sensor signal, and sets the time period for the reference-frequency waveform signal to any one of a time period immediately before the time period for the knocking-frequency waveform signal and a time period at the time of non-ignition.

A knocking determination device for an internal combustion engine according to an eighth aspect of the invention for solving the above problems is the knocking determination device for an internal combustion engine according to any one of the first to seventh aspects of the invention in which the control means obtains a standard deviation for a plurality of the second computation values, and obtains the average by using the second computation values within a range of the standard deviation.

A knocking determination device for an internal combustion engine according to a ninth aspect of the invention for solving the above problems is the knocking determination device for an internal combustion engine according to any one of the first to eighth aspects of the invention in which the control means holds the second computation value obtained from the internal combustion engine in an initial state as a reference value and defines a reference threshold for the reference value, and determines and notifies that sensitivity of the acceleration sensor or the in-cylinder pressure sensor has decreased, in a case where the second computation value newly computed falls beyond the reference threshold from the reference value.

A knocking determination device for an internal combustion engine according to a tenth aspect of the invention for solving the above problems is the knocking determination device for an internal combustion engine according to any one of the first to eighth aspects of the invention in which the control means holds an average of the second computation values on all the cylinder units as a reference value and defines a reference threshold for the reference value, and determines and notifies that sensitivity of the acceleration sensor or the in-cylinder pressure sensor has decreased, in a case where the second computation value newly computed falls beyond the reference threshold from the reference value.

A knocking control device for an internal combustion engine according to an eleventh aspect of the invention for solving the above problems is a knocking control device for an internal combustion engine using the knocking determination device for an internal combustion engine according to any one of the first to tenth aspects of the invention, wherein the control means retards ignition timings of the cylinder units, lowers output of the internal combustion engine, or stops the internal combustion engine in accordance with the knocking determination.

BRIEF DESCRIPTION OF THE DRAWINGS

According to the present invention, a knock index including the knocking intensity and the knocking occurrence frequency is used. In this way, knocking determination can be performed easily, and the larger the knocking, the quicker it can be detected. In addition, sensitivity decrease due to aging can be detected as well.

DETAILED DESCRIPTION

Embodiments of a knocking determination device and a knocking control device for an internal combustion engine according to the present invention will be described below with reference to FIGS. 1 to 5.

Embodiment 1

Figure 1:
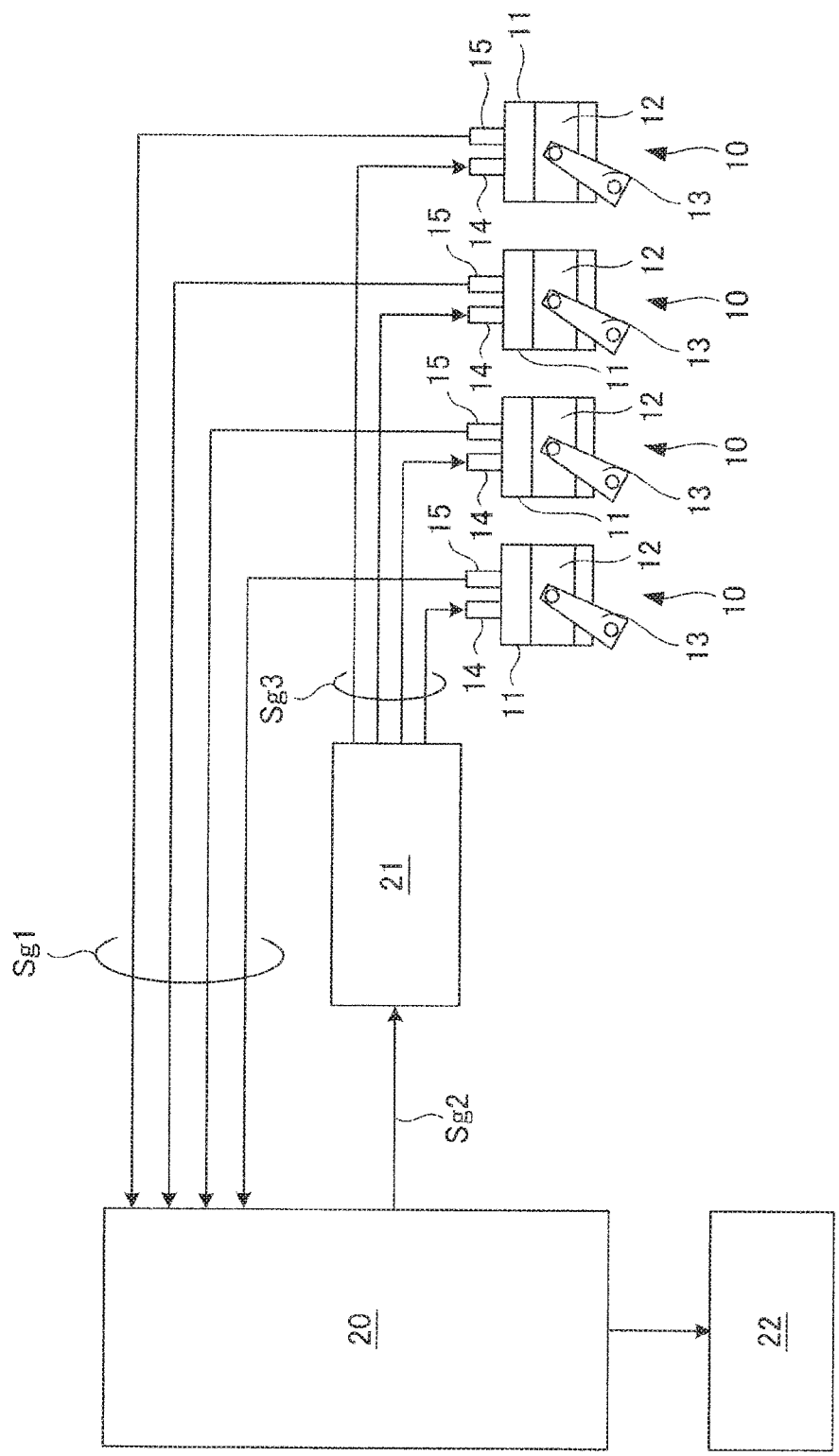
FIG. 1 is a schematic configuration diagram explaining an exemplary embodiment of a knocking determination device and a knocking control device for an internal combustion engine according to the present invention.
Figure 2:
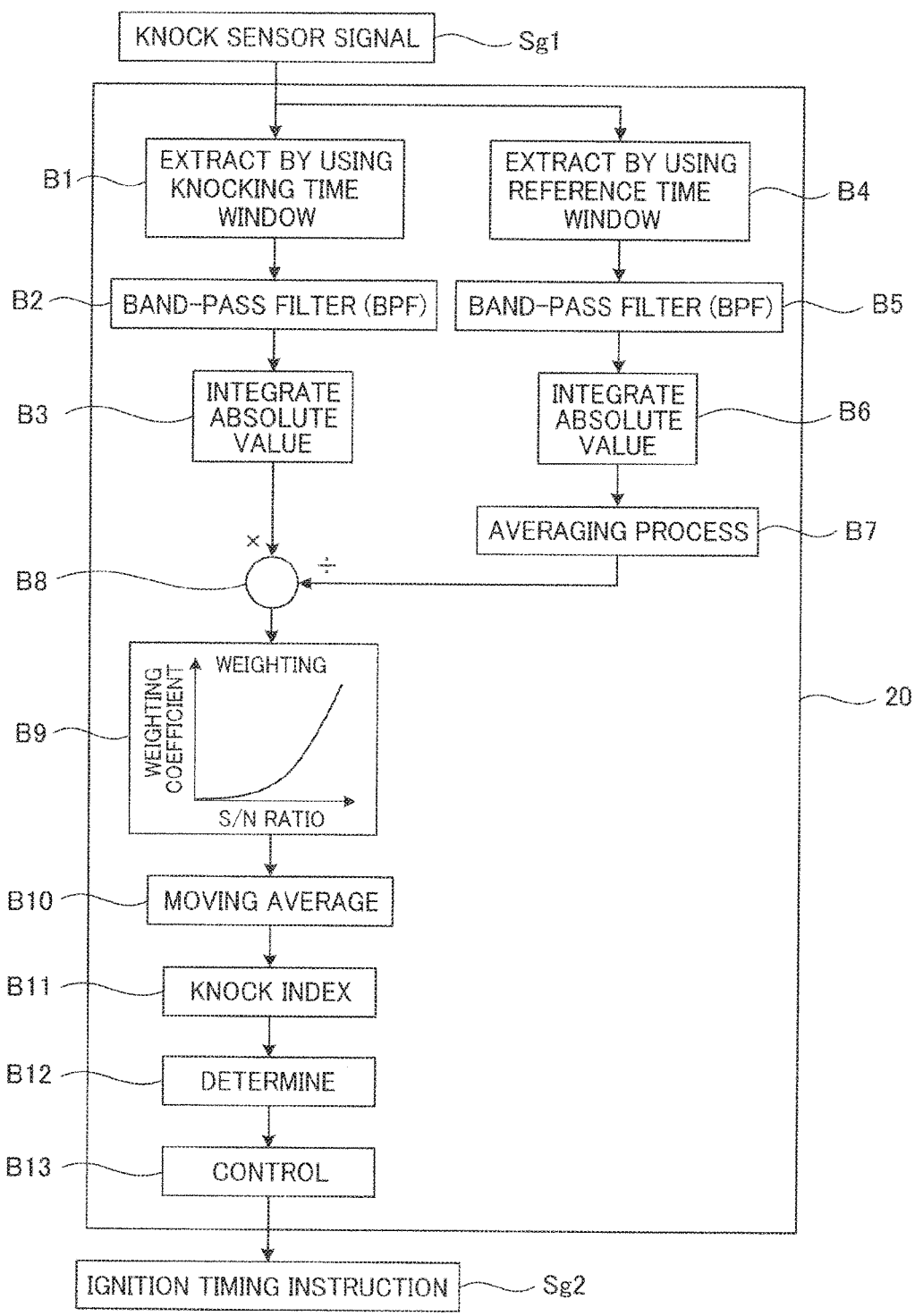
FIG. 2 is a block diagram explaining an example (Embodiment 1) of knocking determination and control by the knocking determination device and the knocking control device for an internal combustion engine shown in FIG. 1.
Figure 3:
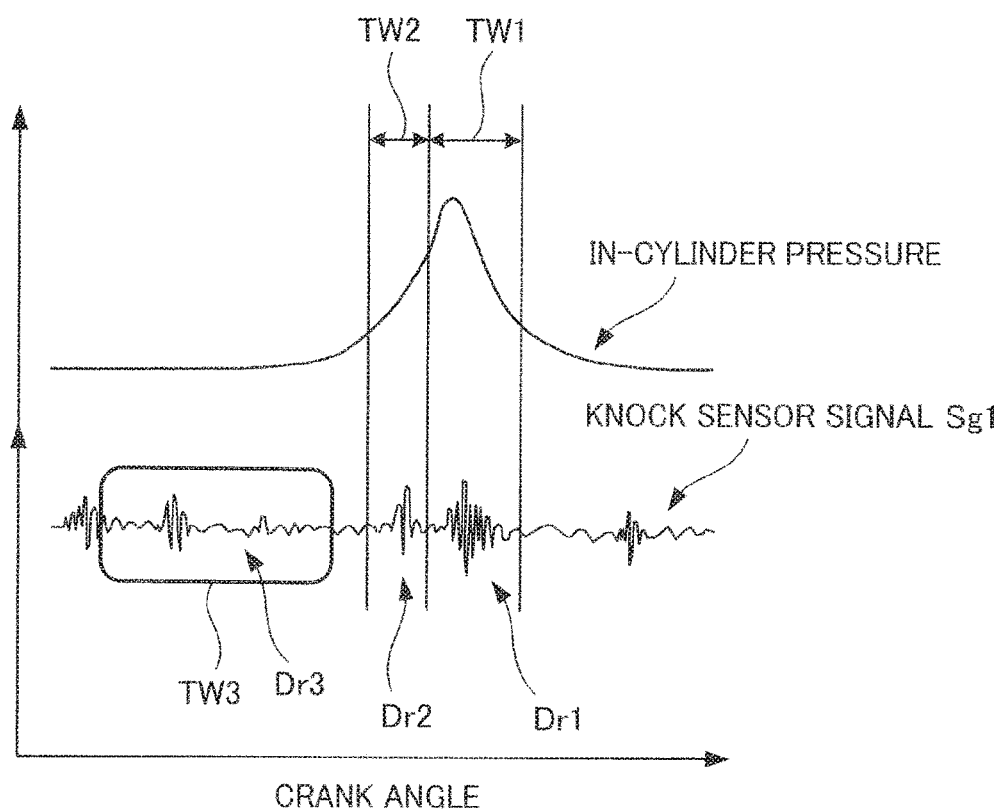
FIG. 3 is a diagram explaining time windows in the block diagram shown in FIG. 2.

FIG. 1 is a schematic configuration diagram explaining a knocking determination device and a knocking control device for an internal combustion engine in this embodiment. Also, FIG. 2 is a block diagram explaining knocking determination and control by the knocking determination device and the knocking control device for an internal combustion engine shown in FIG. 1, and FIG. 3 is a diagram explaining time windows in the block diagram shown in FIG. 2.

As shown in FIG. 1, for the knocking determination device and the knocking control device for an internal combustion engine in this embodiment, an internal combustion engine (engine) includes at least one cylinder unit 10 (four cylinder units 10 are exemplarily shown in FIG. 1), an ECU (Electronics Control Unit) 20 configured to perform determination and control by means of computation processes to be described later, and an ignition unit 21 configured to control spark plugs 14 to be described later based on instructions from the ECU 20. Note that a warning unit 22 will be described in Embodiment 4 to be described later.

Each cylinder unit 10 includes a cylinder 11, a piston 12 configured to reciprocate inside the cylinder 11, and a crank 13 connected to the piston 12, and a crankshaft (not shown) is rotationally driven through the crank 13. The cylinder unit 10 further includes an intake valve and an intake port through which to feed air into the cylinder 11 along with fuel made of gas, petrol, or the like, an exhaust valve and an exhaust port through which to discharge the fuel out of the cylinder 11 after its combustion, and the like, but they are not shown in FIG. 1.

The fuel fed into each cylinder 11 is combusted by igniting it using the spark plug 14 mounted to the cylinder 11. In doing so, a physical quantity correlated to the intensity of knocking occurring in each cylinder unit 10 is detected as a knock sensor signal Sg1 by using a knock sensor 15 mounted to the corresponding cylinder 11. In this embodiment, an acceleration sensor configured to detect acceleration is used as the knock sensor 15. However, this embodiment and Embodiments 2 to 4 to be described later can be carried out by using an in-cylinder pressure sensor configured to detect in-cylinder pressure, instead of the acceleration sensor.

The knock sensor signal Sg1 from each cylinder unit 10, detected by the corresponding knock sensor 15, is inputted into the ECU 20. Using the inputted knock sensor signal Sg1, the ECU 20 performs later-described computation processes to perform knocking determination. Then, based on the knocking determination by the computation processes, the ECU 20 transmits an ignition timing instruction Sg2 for each cylinder unit 10 to the ignition unit 21. Based on the ignition timing instruction Sg2, the ignition unit 21 in turn transmits an ignition signal Sg3 to each cylinder unit 10.

Note that each cylinder unit 10, shown in FIG. 1, is also provided with a crank angle sensor configured to detect the crank angle of the crankshaft, and a signal from this sensor is also inputted into the ECU 20 and used in later-described computation processes.

Meanwhile, the internal combustion engine shown in FIG. 1 may be a different internal combustion engine as long as its configuration has equivalent functions. For example, it may be a gas engine, a petrol engine, a diesel engine, or the like.

Next, the knocking determination and control by the knocking determination device and the knocking control device for an internal combustion engine shown in FIG. 1 will be described with reference to FIGS. 2 and 3. Note that the following knocking determination and control are performed for each cylinder unit at each cycle.

(Block B1)

When the knock sensor signal Sg1 from each cylinder unit 10, detected by the corresponding knock sensor 15, is inputted into the ECU 20, the ECU 20 extracts knocking data from the knock sensor signal Sg1 by using a knocking time window TW1 (see FIG. 3) as a time period in which knocking occurs. The knocking time window TW1 may be a predefined range of crank angles. Here, in one example, the knocking time window TW1 is from a crank angle after ignition but before the peak of the in-cylinder pressure to a crank angle at the end of combustion.

(Block B2)

The ECU 20 passes the extracted knocking data through a BPF configured to pass only knocking-frequency components, to extract a knocking-frequency (e.g. about 3 kHz) waveform signal.

(Block B3)

The ECU 20 performs a computation process on the extracted knocking-frequency waveform signal to obtain a first computation value. For example, the ECU 20 performs a computation process of obtaining the integration value of the absolute value of the waveform signal to obtain a value equivalent to a POA. Note that, instead of this computation process, the ECU 20 may perform a computation process of obtaining the greatest value of amplitude of the waveform signal or a computation process of performing an FFT analysis on the waveform signal and obtaining a POA thereof. Here, the integration value and the POA mentioned above are mathematically equivalent.

In the case of performing an FFT analysis and obtaining a POA, the ECU 20 may obtain the POA by calculating a power spectrum with the FFT analysis, calculating power spectral densities based on the calculated power spectrum, and calculating the sum of squares of the power spectral densities around the knocking frequencies.

(Block B4)

As in above-described Block B1, the ECU 20 extracts reference data from the knock sensor signal Sg1 by using a reference time window.

The reference time window and the reference data will now be described with reference to FIG. 3. As the reference data, data Dr1 at the time of non-knocking, data Dr2 at an initial stage of combustion, or data Dr3 of a background at the time of non-ignition can be used. Meanwhile, FIG. 3 also shows the in-cylinder pressure at the cylinder 11 for reference.

In the case of using the data Dr1 at the time of non-knocking, data not greater than a prescribed value is held using the same time window as the knocking time window TW1 for knocking detection, and this data is used as the reference data. Whenever new data not greater than the prescribed value is acquired, the held data is updated thereto, and this updated data is used as the reference data.

Alternatively, in the case of using the data Dr2 at the initial stage of combustion, data not in the time window TW1 but in a time window TW2 immediately before the time window TW1 is used. Likewise, in the case of using the data Dr3 of a background at the time of non-ignition, data not in the time window TW1 but in a time window TW3 at the time of non-ignition is used.

(Block B5)

As in above-described Block B2, the ECU 20 passes the extracted reference data through a BPF configured to pass only reference-frequency components, to extract a reference-frequency waveform signal.

Here, in the case where the same time window, i.e. the time window TW1 is used for the reference data and the knocking data, the ECU 20 may use a BPF configured to pass only components of the same frequencies as the knocking detection frequencies (e.g. about 3 kHz). On the other hand, in the case where the time window for the reference data is different from the time window for the knocking data, i.e. the time window TW2 or TW3 is used, the reference BPF is likewise different; in this case, the ECU 20 may use a BPF configured to pass only components of frequencies different from the knocking detection frequencies (e.g. about 1 kHz).

(Block B6)

As in above-described Block B3, the ECU 20 performs a computation process on the extracted reference-frequency waveform signal to obtain a second computation value. For example, the ECU 20 obtains the integration value of the absolute value of the reference-frequency waveform signal, the greatest value of amplitude thereof, or a POA thereof.

(Block B7)

The ECU 20 performs an averaging process on the second computation value obtained by the computation process in Block B6 to obtain a reference average.

In doing so, the ECU 20 may obtain the reference average by performing a moving average process using the second computation values from a plurality of cycles including the current cycle and one or more last cycles. Alternatively, for example, the ECU 20 may pass the second computation values through a low-pass filter for removing upper and lower limit values, and then obtain the reference average therefrom. Still alternatively, the ECU 20 may obtain a standard deviation ($\sigma$) for the second computation values from a plurality of cycles and obtain the reference average from the second computation values within the range of $1\sigma$ thus obtained. While it is necessary to set an upper limit value and a lower limit value, using the second computation values within the range of $1\sigma$ does not require setting an upper limit value or a lower limit value; thus, even when aging occurs, for example, the reference average can be obtained following that aging.

(Block B8)

The ECU 20 divides the first computation value, obtained by the computation process in Block B3, by the reference average, obtained by the averaging process in Block B7, to obtain the S/N ratio of the first computation value. In this way, the individual difference in sensor sensitivity between the knock sensors 15 can be corrected.

(Block B9)

The ECU 20 defines an S/N ratio-weighting coefficient correlation in advance and weights the S/N ratio obtained in Block B8. Specifically, the ECU 20 obtains a product by multiplying the obtained S/N ratio by a corresponding weighting coefficient. This weighting coefficient is a coefficient that converts the obtained S/N ratio into a numerical value including the knocking intensity and also the knocking occurrence frequency. This makes it possible to perform knocking determination only by evaluating a single numerical value at a single cycle. In conventional method, knocking determination is performed based on the knocking intensity and the knocking occurrence frequency, and a certain number of cycles are necessary for the determination. However, by using the weighting mentioned above, large knocking can be detected quickly and easily.

In practice, the S/N ratio-weighting coefficient correlation is defined as map data by performing test operation of the internal combustion engine. In doing so, the S/N ratio-weighting coefficient correlation is defined to be equivalent to the correlation between knocking severity, indicating damage to the internal combustion engine (e.g. damage by the liner temperature, damage to the piston ring and gasket, etc.) and advancement of the ignition timing. For example, based on the maximum S/N ratio at which the engine is damaged at only once, the S/N ratio-weighting coefficient correlation is defined as a curve as shown in Block B9 (e.g. an n-th order curve), that is, the larger the S/N ratio, the larger the weighting coefficient.

(Block B10)

The ECU 20 obtains a moving average for the S/N ratio weighted (product) in Block B9. For example, the ECU 20 obtains a moving average of a plurality of weighted S/N ratios including the current S/N ratio and one or more last S/N ratios.

(Block B11)

In this embodiment, the moving average obtained in Block B10 serves as a knock index.

(Block B12)

The ECU 20 performs knocking determination on the knock index in Block B11 based on a predefined knock determination threshold. Note that the knock determination threshold varies depending on the specification of the internal combustion engine and is therefore set in accordance with the specification. However, the knock determination threshold is 20 to 50%, for example.

(Block B13)

The ECU 20 performs control based on the knocking determination in Block B13. For example, the ECU 20 transmits an ignition timing instruction Sg2 to the ignition unit 21 to delay (retard) the ignition timing by a short or long period of time or even lower the output or trip (stop) the engine in accordance with the magnitude of the knock index.

Using a weighted knock index as described above can provide a numerical value including the knocking intensity and also the knocking occurrence frequency. Thus, it is possible to handle small to large knocking with a single analog value. In this way, the knocking determination can be easier and the control can be easier, and also large knocking can be detected quickly.

Embodiment 2

Figure 4:
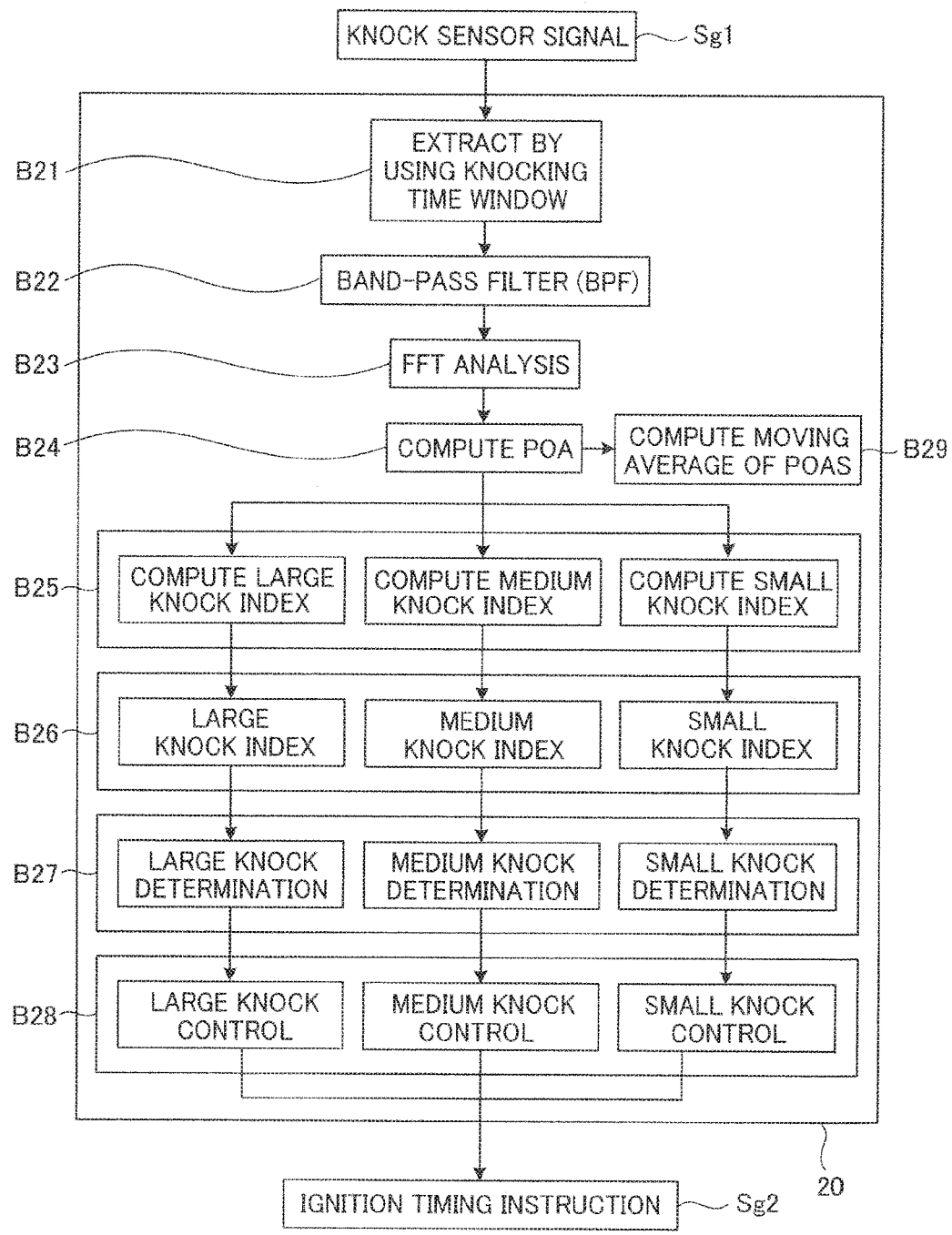
FIG. 4 is a block diagram explaining another example (Embodiment 2) of the knocking determination and control by the knocking determination device and the knocking control device for an internal combustion engine shown in FIG. 1.

FIG. 4 is a block diagram explaining knocking determination and control by a knocking determination device and a knocking control device for an internal combustion engine in this embodiment. The knocking determination and the control in this embodiment will be described with reference to FIG. 4. Here, the knocking determination device and the knocking control device for an internal combustion engine shown in FIG. 1 perform the knocking determination and the control to be described below as an example. However, different devices may be employed as long as their configurations have equivalent functions. Also, the following knocking determination and control are performed for each cylinder unit at each cycle as well.

(Block B21)

When the knock sensor signal Sg1 from each cylinder unit 10, detected by the corresponding knock sensor 15, is inputted into the ECU 20, the ECU 20 extracts knocking data from the knock sensor signal Sg1 by using a knocking time window TW1 as a time period in which knocking occurs. The knocking time window TW1 may be the one described in Embodiment 1 (see FIG. 3).
(Block B22)
The ECU 20 passes the extracted knocking data through a BPF configured to pass only knocking-frequency components, to extract a knocking-frequency (e.g. about 3 kHz) waveform signal.
(Blocks B23, B24)
The ECU 20 performs a computation process of performing an FFT analysis on the extracted knocking-frequency waveform signal and obtaining a POA of the knocking-frequency waveform signal subjected to the FFT analysis. Instead of this computation process, the ECU 20 may perform a computation process of obtaining the greatest value of amplitude of the waveform signal or perform a computation process of obtaining the integration value of the absolute value of the waveform signal to obtain a value equivalent to a POA. Note that the POA and the integration value mentioned above are mathematically equivalent.
(Blocks B25, B26)
Using Table 1 and Formula 1 given below, the ECU 20 computes knock indexes, namely, a large knock index, a medium knock index, and a small knock index, for the POA obtained by the computation process. In Formula 1 below, C1 denotes the number of cycles in which a threshold Th defined in advance for the POA is exceeded, and C2 denotes a predefined number of cycles; the ECU 20 obtains a percentage by dividing the number of cycles C1 in which the threshold Th is exceeded by the predefined number of cycles C2.

Also, in view of two types of information, namely, the knocking intensity and the knocking occurrence frequency, Table 1 defines a plurality of sets of the threshold Th and the predefined number of cycles C2 depending on the threshold Th for the large knock index, the medium knock index, and the small knock index. Note that each threshold Th and each number of cycles C2 shown in Table 1 are exemplarily shown and can be changed as appropriate in accordance with characteristics of the internal combustion engine. However, the predefined number of cycles C2 decreases as the threshold Th increases.

Each knock index [%]=C1/C2×100  (Formula 1)

TABLE 1

| | Threshold Th | Predefined number of cycles C2 | Control upon knock determination |
|---|---|---|---|
| Large knock index | 0.5 to 0.8 | 1 (instantaneous value) | Control to trip engine/lower output |
| Medium knock index | 0.3 to 0.7 | 10 | Retard ignition timing (long) |
| Small knock index | 0.2 to 0.5 | 50 | Retard ignition timing (short) |

(Blocks B27, B28)
Based on a predefined knock determination threshold for each of the large knock index, the medium knock index, and the small knock index, the ECU 20 performs determination on the computed large knock index, middle knock index, and small knock index and performs control based on the determination. For example, the ECU 20 transmits an ignition timing instruction Sg2 to the ignition unit 21 to delay (retard) the ignition timing by a short period of time in a case of determining the presence of a small knock or delay (retard) the ignition timing by a long period of time in a case of determining the presence of a medium knock, or even lower the output or trip (stop) the engine in a case of determining the presence of a large knock. Note that the knock determination threshold varies depending on the specification of the internal combustion engine and is therefore set in accordance with the specification. However, the knock determination threshold is 20 to 50%, for example.
(Block B29)
The ECU 20 obtains a moving average for the POA obtained by the computation process in Block B24. For example, the ECU 20 obtains a moving average of a plurality of POAs including the current POA and one or more last POAs. By obtaining the POA moving average, it is possible to figure out the tendency of knocking.

In conventional method, an FFT analysis is performed and a POA is computed, that's all. Hence, this method takes time to detect a knock and is not suitable for detecting a large knock. On the other hand, as described above, a POA is converted into a large knock index, a medium knock index, and a small knock index, and the predefined number of cycles is varied for each knock index in the calculation of the knock index. In this way, the quickness of detection can be varied for each knock index. Hence, the larger the knock, the quicker it can be detected.

Embodiment 3

Figure 5:
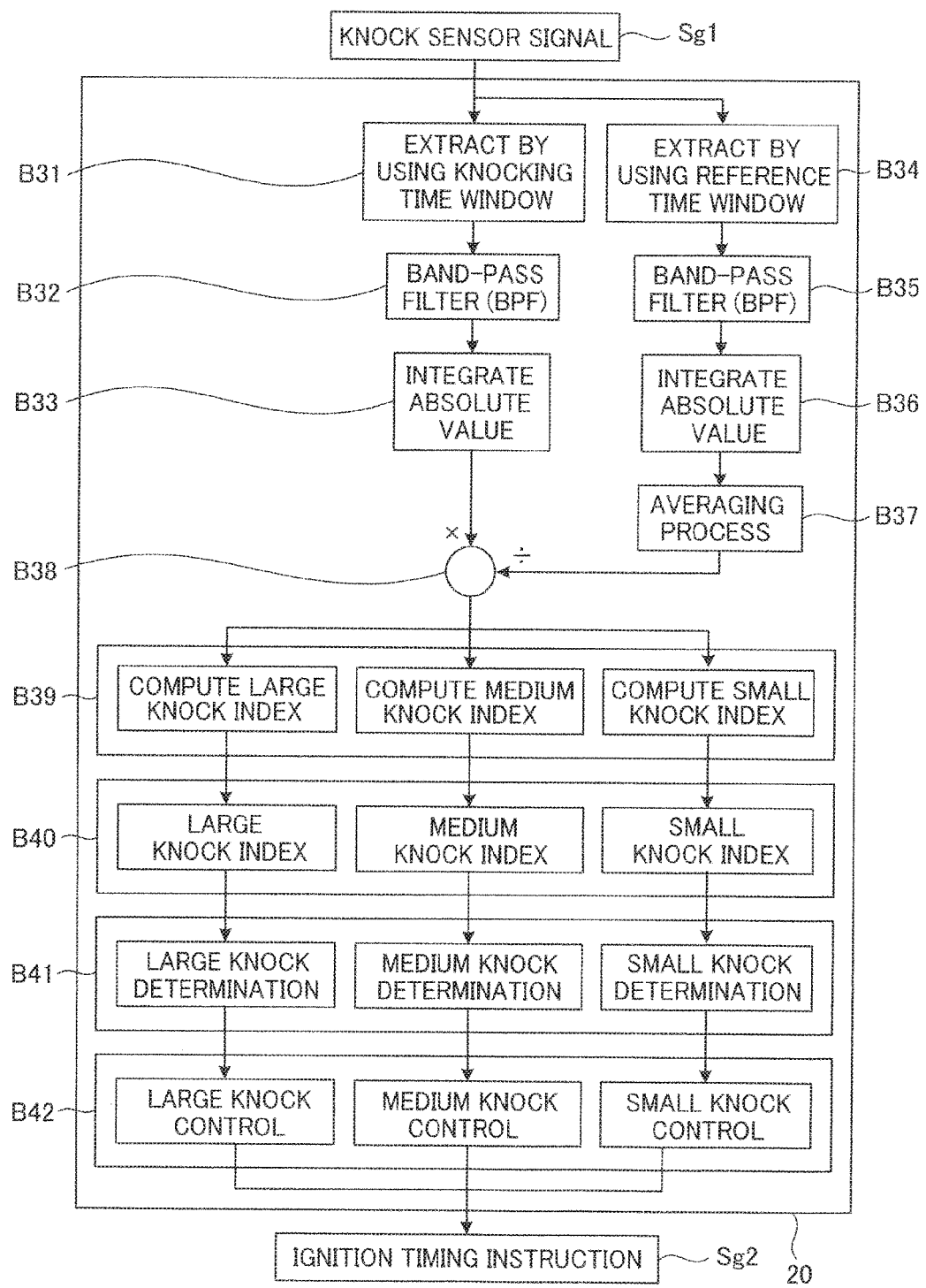
FIG. 5 is a block diagram explaining still another example (Embodiment 3) of the knocking determination and control by the knocking determination device and the knocking control device for an internal combustion engine shown in FIG. 1.

FIG. 5 is a block diagram explaining knocking determination and control by a knocking determination device and a knocking control device for an internal combustion engine in this embodiment. The knocking determination and the control in this embodiment will be described with reference to FIG. 5. Here, the knocking determination device and the knocking control device for an internal combustion engine shown in FIG. 1 likewise perform the knocking determination and the control to be described below as an example. However, different devices may be employed as long as their configurations have equivalent functions. Also, the following knocking determination and control are performed for each cylinder unit at each cycle as well.
(Block B31)
When the knock sensor signal Sg1 from each cylinder unit 10, detected by the corresponding knock sensor 15, is inputted into the ECU 20, the ECU 20 extracts knocking data from the knock sensor signal Sg1 by using a knocking time window TW1 as a time period in which knocking occurs. The knocking time window TW1 may be the one described in Embodiment 1 (see FIG. 3).
(Block B32)
The ECU 20 passes the extracted knocking data through a BPF configured to pass only knocking-frequency components, to extract a knocking-frequency (e.g. about 3 kHz) waveform signal. The knocking BPF may also be the one described in Embodiment 1.
(Block B33)
The ECU 20 performs a computation process on the extracted knocking-frequency waveform signal to obtain a first computation value. For example, the ECU 20 performs a computation process of obtaining the integration value of the absolute value of the waveform signal to obtain a value equivalent to a POA. Note that, instead of this computation process, the ECU 20 may perform a computation process of obtaining the greatest value of amplitude of the waveform signal or a computation process of performing an FFT analysis on the waveform signal and obtaining a POA thereof. Here, the integration value and the POA mentioned above are mathematically equivalent.
(Block B34)
As in above-described Block B31, the ECU 20 extracts reference data from the knock sensor signal Sg1 by using a reference time window. The reference time window and the reference data may also be those described in Embodiment 1 (see FIG. 3).
(Block B35)
As in above-described Block B32, the ECU 20 passes the extracted reference data through a BPF configured to pass only reference-frequency components, to extract a reference-frequency waveform signal. The reference BPF can also be the one described in Embodiment 1.
(Block B36)
As in above-described Block B33, the ECU 20 performs a computation process on the extracted reference-frequency waveform signal to obtain a second computation value. For example, the ECU 20 obtains the integration value of the absolute value of the reference-frequency waveform signal, the greatest value of amplitude thereof, or a POA thereof.
(Block B37)
The ECU 20 performs an averaging process on the second computation value obtained by the computation process in Block B36 to obtain a reference average. Here, the reference average may also be obtained in the same manner as Embodiment 1.
(Block B38)
The ECU 20 divides the first computation value, obtained by the computation process in Block B33, by the reference average, obtained by the averaging process in Block B37, to obtain the S/N ratio of the first computation value. In this way, the individual difference in sensor sensitivity between the knock sensors 15 can be corrected.
(Blocks B39, B40)
Using above-mentioned Table 1 and Formula 1, the ECU 20 computes knock indexes, namely, a large knock index, a medium knock index, and a small knock index, for the S/N ratio obtained by the computation process. Note that, in this embodiment, the thresholds Th in Table 1 may be defined with for the S/N ratio.
(Blocks B41, B42)
Based on a predefined knock determination threshold for each of the large knock index, the medium knock index, and the small knock index, the ECU 20 performs determination on the computed large knock index, middle knock index, and small knock index and performs control based on the determination. For example, the ECU 20 transmits an ignition timing instruction Sg2 to the ignition unit 21 to delay (retard) the ignition timing by a short period of time in a case of determining the presence of a small knock or delay (retard) the ignition timing by a long period of time in a case of determining the presence of a medium knock, or even lower the output or trip (stop) the engine in a case of determining the presence of a large knock. Note that the knock determination threshold varies depending on the specification of the internal combustion engine and is therefore set in accordance with the specification. However, the knock determination threshold is 20 to 50%, for example.

As described above, the predefined number of cycles is varied for each knock index in the calculation of the knock index. In this way, the quickness of detection can be varied for each knock index. Hence, the larger the knock, the quicker it can be detected.

Embodiment 4

A knocking determination device and a knocking control device for an internal combustion engine in this embodiment will be described with reference to FIG. 1. Here, the knocking determination device and the knocking control device for an internal combustion engine shown in FIG. 1 are likewise shown as an example. However, different devices may be employed as long as their configurations have equivalent functions.

In this embodiment, a warning unit 22 is further included which is configured to issue and transmit an alarm based on an instruction from the ECU 20.

The ECU 20 holds data on the second computation value (the integration value of the absolute value of the reference-frequency waveform signal, the greatest value of amplitude thereof, or a POA thereof) described in Embodiment 1 in advance, the data being obtained from the internal combustion engine in its initial state before shipment. The ECU 20 sets this data as a reference value. Then, if the second computation value of any cylinder unit 10 acquired afterward falls beyond a predefined reference threshold from the reference value, the ECU 20 determines that sensitivity has decreased due to aging.

Alternatively, the ECU 20 may perform an averaging process on the second computation values on all the cylinder units 10 and set this average as a reference value. In this case too, if the second computation value of any cylinder unit 10 acquired afterward falls beyond the predefined reference threshold from the reference value, the ECU 20 determines that the sensitivity has decreased due to aging.

In both cases, the ECU 20 can detect two types of aging which are aging of the knock sensors 15 and aging of cables.

Then, using the warning unit 22, the ECU 20 issues the result of detection of the sensitivity decrease due to the aging to an operator or transmits the result to a remote monitoring device to notify the aging or its sign.

In the above manner, sensitivity decrease due to aged deterioration of the knock sensors 15 and the cables can be detected.

EXPLANATION OF REFERENCE NUMERALS 10 cylinder unit
11 cylinder
14 spark plug
15 knock sensor
20 ECU (control means)
21 ignition unit
22 warning unit

The invention claimed is:
1. A knocking determination device for an internal combustion engine comprising:
an acceleration sensor or an in-cylinder pressure sensor mounted to each cylinder unit of an internal combustion engine and configured to measure acceleration or in-cylinder pressure correlated to knocking intensity; and
control means for performing knocking determination and control based on a sensor signal measured by the acceleration sensor or the in-cylinder pressure sensor, wherein
the control means
extracts a knocking-frequency waveform signal from at least one time period for knocking in the sensor signal and computes a first computation value from the knocking-frequency waveform signal,
extracts a reference-frequency waveform signal from at least two reference time periods, wherein the at least two reference time periods differ from the one or more time periods for knocking, and wherein the at least two reference time periods comprise at least one time period immediately before the at least one time period for knocking and a time period at a time of non-ignition, in the sensor signal, computes a second computation value from the reference-frequency waveform signal, and obtains an average of a plurality of the second computation values, obtains a ratio by dividing the first computation value by the average, defines, in advance, a weighting coefficient with which to convert the ratio into a knock index including knocking intensity and a knocking occurrence frequency, obtains a product by multiplying the ratio by the weighting coefficient, obtains a moving average of a plurality of the products, and uses the moving average as the knock index for performing the knocking determination, and performs the knocking determination based on a magnitude of the knock index.

2. The knocking determination device for an internal combustion engine according to claim 1, wherein the control means increases the weighting coefficient as the ratio increases.

3. The knocking determination device for an internal combustion engine according to claim 1, wherein the control means obtains a standard deviation for a plurality of the second computation values, and obtains the average by using the second computation values within a range of the standard deviation.

4. The knocking determination device for an internal combustion engine according to claim 1, wherein the control means holds the second computation value obtained from the internal combustion engine in an initial state as a reference value and defines a reference threshold for the reference value, and determines and notifies that sensitivity of the acceleration sensor or the in-cylinder pressure sensor has decreased, in a case where the second computation value newly computed falls beyond the reference threshold from the reference value.

5. The knocking determination device for an internal combustion engine according to claim 1, wherein the control means holds an average of the second computation values on all the cylinder units as a reference value and defines a reference threshold for the reference value, and determines and notifies that sensitivity of the acceleration sensor or the in-cylinder pressure sensor has decreased, in a case where the second computation value newly computed falls beyond the reference threshold from the reference value.

6. A knocking control device for an internal combustion engine using the knocking determination device for an internal combustion engine according to claim 1, wherein the control means retards ignition timings of the cylinder units, lowers output of the internal combustion engine, or stops the internal combustion engine in accordance with the knocking determination.

7. A knocking determination device for an internal combustion engine comprising:

an acceleration sensor or an in-cylinder pressure sensor mounted to each cylinder unit of an internal combustion engine and configured to measure acceleration or in-cylinder pressure correlated to knocking intensity; and control means for performing knocking determination and control based on a sensor signal measured by the acceleration sensor or the in-cylinder pressure sensor, wherein the control means extracts a knocking-frequency waveform signal from one or more time periods for knocking in the sensor signal and computes a first computation value from the knocking-frequency waveform signal, extracts a reference-frequency waveform signal from at least two reference time periods, wherein the at least two reference time periods differ from the one or more time periods for knocking, and comprises a time period immediately before the time period for the knocking-frequency waveform signal and a time period at a time of non-ignition, in the sensor signal, computes a second computation value from the reference-frequency waveform signal, and obtains an average of a plurality of the second computation values, obtains a ratio by dividing the first computation value by the average, defines, in advance, a threshold for the ratio and a predefined number of times depending on the threshold, obtains a percentage by dividing the number of times the ratio exceeds the threshold by the predefined number of times, and uses the percentage as the knock index for performing the knocking determination.

8. The knocking determination device for an internal combustion engine according to claim 7, wherein the control means defines a plurality of sets of the threshold and the predefined number of times depending on the threshold, the threshold and the predefined number of times differing between the plurality of sets such that the predefined number of times decreases as the threshold increases.

* * * * *